US010063941B2

(12) United States Patent
Tsai et al.

(10) Patent No.: US 10,063,941 B2
(45) Date of Patent: Aug. 28, 2018

(54) METHOD AND APPARATUS FOR WRITING IMAGES INTO MEMORY (71) Applicant: MStar Semiconductor, Inc., Hsinchu Hsien (TW)

(72) Inventors: Shang-Ru Tsai, Taipei (TW); Chung-Yi Ke, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 265 days.

(21) Appl. No.: 14/292,999

(22) Filed: Jun. 2, 2014

(65) Prior Publication Data
US 2014/0365536 A1 Dec. 11, 2014

(30) Foreign Application Priority Data

Jun. 5, 2013 (TW) .............................. 102119954 A (51) Int. Cl.
G06F 17/00 (2006.01)
H04N 21/8549 (2011.01)
H04N 21/433 (2011.01)

(52) U.S. Cl.
CPC ..... *H04N 21/8549* (2013.01); *H04N 21/4334* (2013.01)

(58) Field of Classification Search
CPC ...................... G06F 17/30017; H04N 21/8549
See application file for complete search history.

(56) References Cited

U.S. PATENT DOCUMENTS

| 5,276,532 | A | * | 1/1994 | Harrington | ............... | G09G 5/02 |
| | | | | | | 345/545 |
| 5,402,148 | A | * | 3/1995 | Post | ....................... | A61B 5/044 |
| | | | | | | 345/213 |
| 5,953,746 | A | * | 9/1999 | Crocker | .............. | G06F 12/0223 |
| | | | | | | 710/240 |
| 6,411,302 | B1 | * | 6/2002 | Chiraz | .................. | G06F 3/1431 |
| | | | | | | 345/531 |
| 6,502,188 | B1 | * | 12/2002 | Zuraski, Jr. | ........... | G06F 9/3806 |
| | | | | | | 711/125 |
| 6,553,392 | B1 | * | 4/2003 | Mosher, Jr. | ......... | G06F 11/2069 |
| | | | | | | 707/204 |
| 2005/0058432 | A1 | * | 3/2005 | Kennedy | ................ | H04N 7/088 |
| | | | | | | 386/245 |

(Continued)

FOREIGN PATENT DOCUMENTS

CN 1469240 A 1/2004

OTHER PUBLICATIONS

SIPO Office Action, dated Nov. 4, 2016, 9 pages.

*Primary Examiner* — Neveen Abel Jalil
*Assistant Examiner* — Dawaune Conyers
(74) *Attorney, Agent, or Firm* — Edell, Shapiro & Finnan, LLC (57) ABSTRACT

A method for writing images into a memory is provided. The method includes steps of: establishing a first configuration table for configuring the memory into a plurality of first buffers according to a first resolution of a first image; establishing a second configuration table for configuring the memory into a plurality of second buffers according to a second resolution of a second image, wherein the second resolution is different from the first resolution; and determining a position to which the second image is to be written into the memory according to the first configuration table and the second configuration table.

15 Claims, 5 Drawing Sheets

(56) References Cited

U.S. PATENT DOCUMENTS

| | | | |
|---|---|---|---|
| 2011/0317770 A1* | 12/2011 | Lehtiniemi | H04N 19/42 |
| | | | 375/240.25 |
| 2012/0170903 A1* | 7/2012 | Shirron | H04N 5/783 |
| | | | 386/230 |
| 2012/0251085 A1* | 10/2012 | Cheng | H04N 21/4307 |
| | | | 386/337 |
| 2014/0301482 A1* | 10/2014 | Narasimhan | H04N 19/70 |
| | | | 375/240.26 |

* cited by examiner

METHOD AND APPARATUS FOR WRITING IMAGES INTO MEMORY

This application claims the benefit of Taiwan application Serial No. 102119954, filed Jun. 5, 2013, the subject matter of which is incorporated herein by reference.

BACKGROUND OF THE INVENTION

Field of the Invention

The invention relates in general to a method for writing images into a memory, and more particularly to a method for writing images of a video stream into a memory.

Description of the Related Art

With the progress in the Internet and wireless transmission technologies, video streaming has become an emerging method for network multimedia broadcasting. In video streaming, multimedia data is encoded, transmitted from a transmitting end to a receiving end via the Internet or wireless transmission, and then downloaded, decoded and played at the receiving end. A feature of video streaming is that, instead of completely downloading and storing the multimedia data at the receiving end, a part of the multimedia data received is stored and processed at a memory buffer. After having played that part of the multimedia data, the space of the memory buffer is directly released for the use of the subsequently downloaded multimedia data.

For video streaming having a higher resolution provided by a transmitting end, due to a large file size, a data receiving speed at a receiving end may not keep up with a playback speed because of an insufficient network bandwidth or unstable signal strengths of wireless transmission at times, resulting in interrupted playback and depreciated user experiences. In one solution for solving the above situation, a resolution of images in the multimedia data is determined according to the bandwidth or the transmission speed. That is to say, by sacrificing the image resolution, contents of the video streaming can be played uninterruptedly under an insufficient bandwidth or a slower transmission speed.

In practice, a transmitting end may determine the image resolution outputted according to a current bandwidth or transmission speed. Upon detecting a wider bandwidth or a faster transmission speed, the transmitting end transmits a video stream having a higher resolution. Conversely, upon detecting a narrower bandwidth or a slower transmission speed, the transmitting end transmits a video stream having a lower resolution.

More specifically, when a receiving end receives video data, image data in the video data is separated through a demultiplexer, and a resolution of images in the image data is obtained from information of a packet header of the image data. A memory is then divided into a plurality of buffers according to the resolution, and decoded images are respectively written into the buffers. According to time information included in the images in the buffers, the images are sequentially accessed and played. When the resolution of the images changes, the resolution of the images obtained from demultiplexing at a client end also changes. At this point, the memory needs to be again divided into a plurality of buffers according to the changed resolution, and the images of the different resolution after decoding can then be respectively written into the re-divided buffers.

Figure 1:
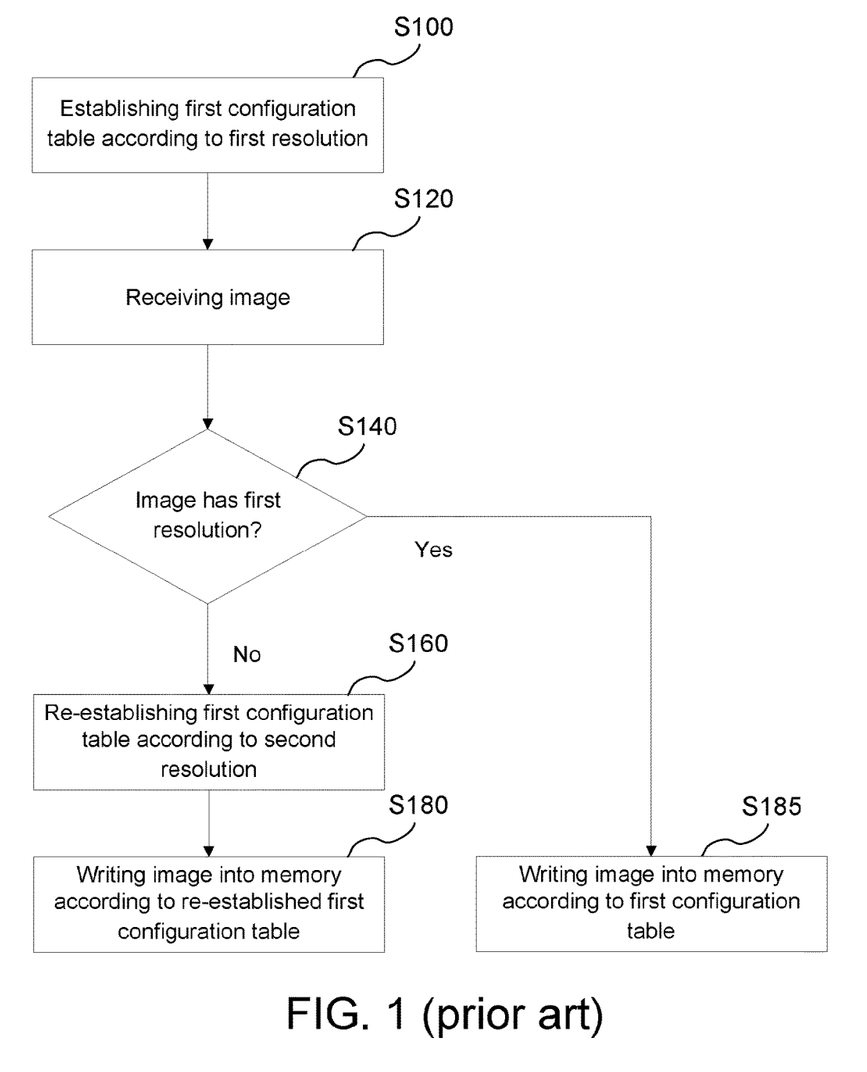
FIG. 1 is a flowchart of a process for writing images into a memory in the prior art.

FIG. 1 shows a flowchart of a process of writing images into a memory in the prior art.

After a client end receives a video stream and obtains image data from the video stream by demultiplexing, step S100 is performed. In step S100, a first configuration table is established according to a first resolution of images in the image data. The first configuration table is associated with a utilization configuration of the memory and configures the memory into a plurality of first buffers. When later playing the images, the images in the memory are accessed and played according to information recorded in the first configuration table.

Data received by the receiving end is a video stream, i.e., the receiving end constantly receives new images. In step S120, an image is received from the video stream. Due to a change in the network bandwidth or wireless transmission speed, the received image may adopt a different resolution.

Thus, in step S140, it is determined whether the resolution of the image is still the first resolution according to the information in the video stream. When the resolution of the image is still the first resolution, step S185 is performed to write the image into the memory according to the first configuration table. When the resolution of the image is a second resolution, step S160 is performed to re-establish the first configuration table according to the second resolution. Step S180 is then performed to write the image into the memory according to the re-established first configuration table.

It is known from the above method for writing images into a memory in the prior art that, when the resolution of the received image changes from the first resolution to the second resolution, the first configuration table needs to be re-established according to the second resolution by step S160 in order to write the image having the second resolution into the memory. At this point, the memory still stores images that have not yet been accessed. However, as the first configuration table is re-established, it is equivalent to discarding the information of those images that have not yet been accessed, such that the playback procedure cannot access the information of the images that have not yet been accessed. As a result, these images that have not yet been accessed may be skipped and be replaced by a black image. That is to say, in the prior art, in the event of a resolution change, one or more images in the playback procedure may be presented by a black image, hence failing seamless switching and undesirably affecting user perceptual experiences.

SUMMARY OF THE INVENTION

Therefore, it is an object of the present invention to provide a method and apparatus for writing images into a memory to prevent the issue of the failure of seamless switching when an image resolution changes as in the prior art.

To achieve the above object, a method for writing images into a memory is provided by the present invention. The method includes: establishing a first configuration table according to a first resolution of a first image, wherein the first configuration table is associated with a utilization configuration of the memory and configures the memory into a plurality of first buffers; establishing a second configuration table according to a second resolution of a second image, wherein the second configuration table is associated with the utilization configuration of the memory and configures the memory into a plurality of second buffers, and the second resolution is different from the first resolution; and determining a position to which the second image is to be written into the memory according to the first configuration table and the second configuration table.

To achieve the above object, an apparatus for writing images into a memory is further provided by the present invention. The apparatus includes: a planning unit, configured to establish a first configuration table according to a first resolution of a first image, and to establish a second configuration table according to a second resolution, wherein the first configuration table is associated with a utilization configuration of the memory and configures the memory into a plurality of first buffers, the second configuration table is associated with the utilization configuration of the memory and configures the memory into a plurality of second buffers, and second configuration table is different from the first configuration table; and a buffer configuring unit, configured to determine a position to which the second image is to be written into the memory according to the first configuration table and the second configuration table.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 2:
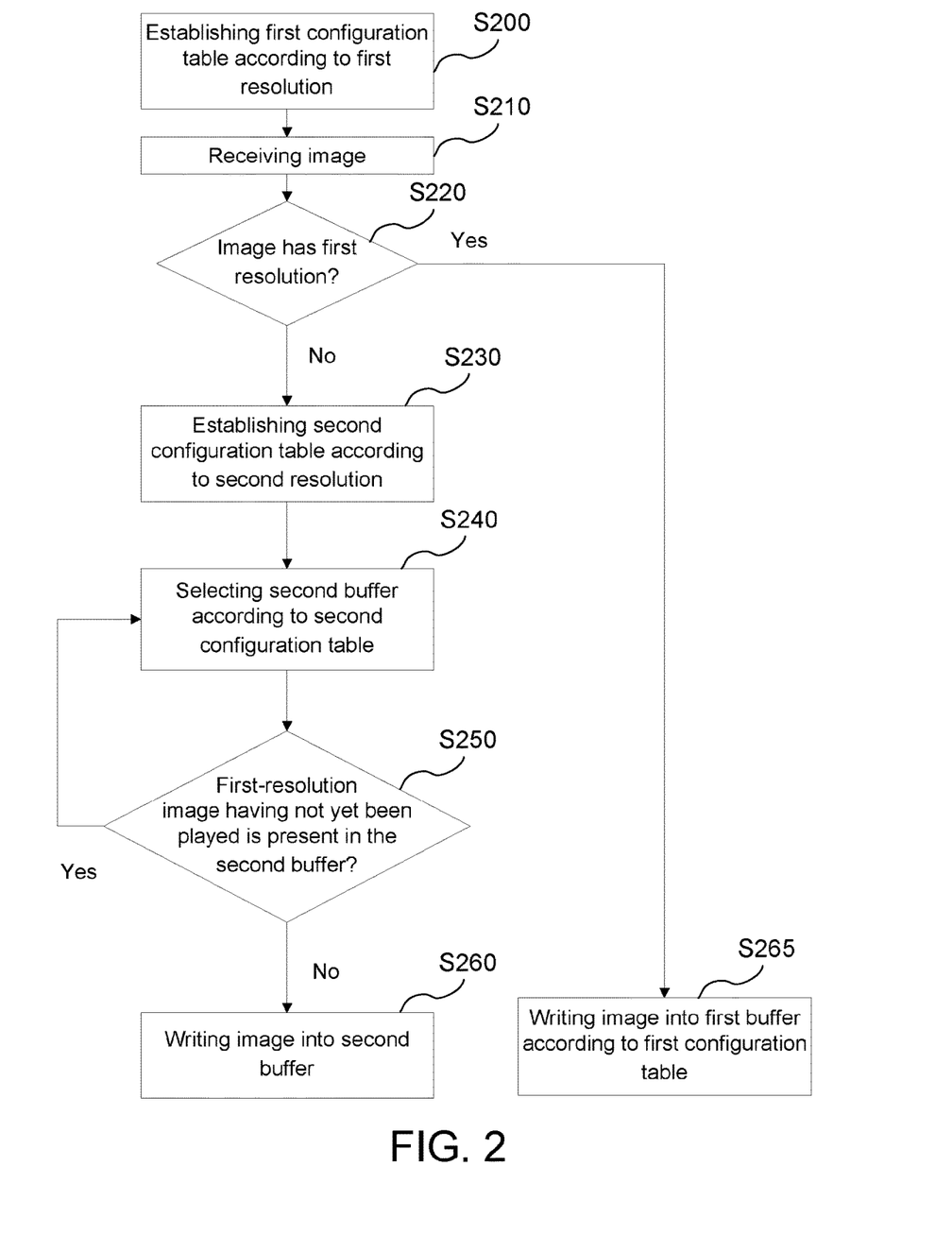
FIG. 2 is a flowchart of a method for writing images into a memory according to an embodiment of the present invention.

FIG. 2 shows a flowchart of a method for writing images into a memory according to an embodiment of the present invention.

After a receiving end receives a video stream and obtains image data from the video stream by demultiplexing, step S200 is performed to establish a first configuration table according to a first resolution of an image in the image data. The first configuration table is associated with a utilization configuration of the memory, and configures the memory into a plurality of first buffers. The first buffers are planned according to the first resolution, and each of the buffers has a size sufficient for writing one image having the first resolution.

When the receiving end continually receives the images having the first resolution, the images are written into the first buffers in the memory according to the first configuration table. Meanwhile, the first buffers into which the images are respectively written are recorded in the first configuration table. That is, the first configuration table also records positions at which the images are respectively stored in the memory. When the images are later accessed from the memory and played, the images in the memory are accessed according to the above information recorded in the first configuration table.

The first configuration table further records which of the images have been accessed. As a video stream is received, the receiving end constantly receives new images in practice. In step S210, an image is received. The newly received image may adopt a different resolution due to a change in the network bandwidth or wireless transmission speed.

In step S220, it is determined whether the resolution of the newly received image is the first resolution according to the information in the video stream. When the resolution of the newly received image is the first resolution, step S265 is performed to write the newly received image into the first buffer of the memory according to the first configuration table. When the resolution of the newly received image is a second resolution, step S230 is performed to establish a second configuration table according to the second resolution.

The second configuration table is associated with the utilization configuration of the memory, and configures the memory into a plurality of second buffers. The buffers are configured according to the second resolution, and each of the buffers has a size sufficient for writing in one image having the second resolution. The second configuration table further records the second buffers into which the images having the second resolution are written. When later accessing the images, the images in the memory are accessed according to the information recorded in the second configuration table. Meanwhile, the second configuration table also records the images that have been accessed.

As a video stream is received, the receiving end constantly receives new images in practice. In step S240, the second buffer is selected according to the second configuration table, and then step S250 is performed. In step S250, the first configuration table is checked to determine whether the first-resolution image having not yet been accessed is present at the position of the second buffer. When no first-resolution image having not yet been accessed is present at the position of the second buffer, step S260 is performed to write the newly received image into the selected second buffer. When the first-resolution image having not yet been accessed is present at the position of the second buffer, step S240 is iterated to select another second buffer according to the second configuration table.

Figure 3:
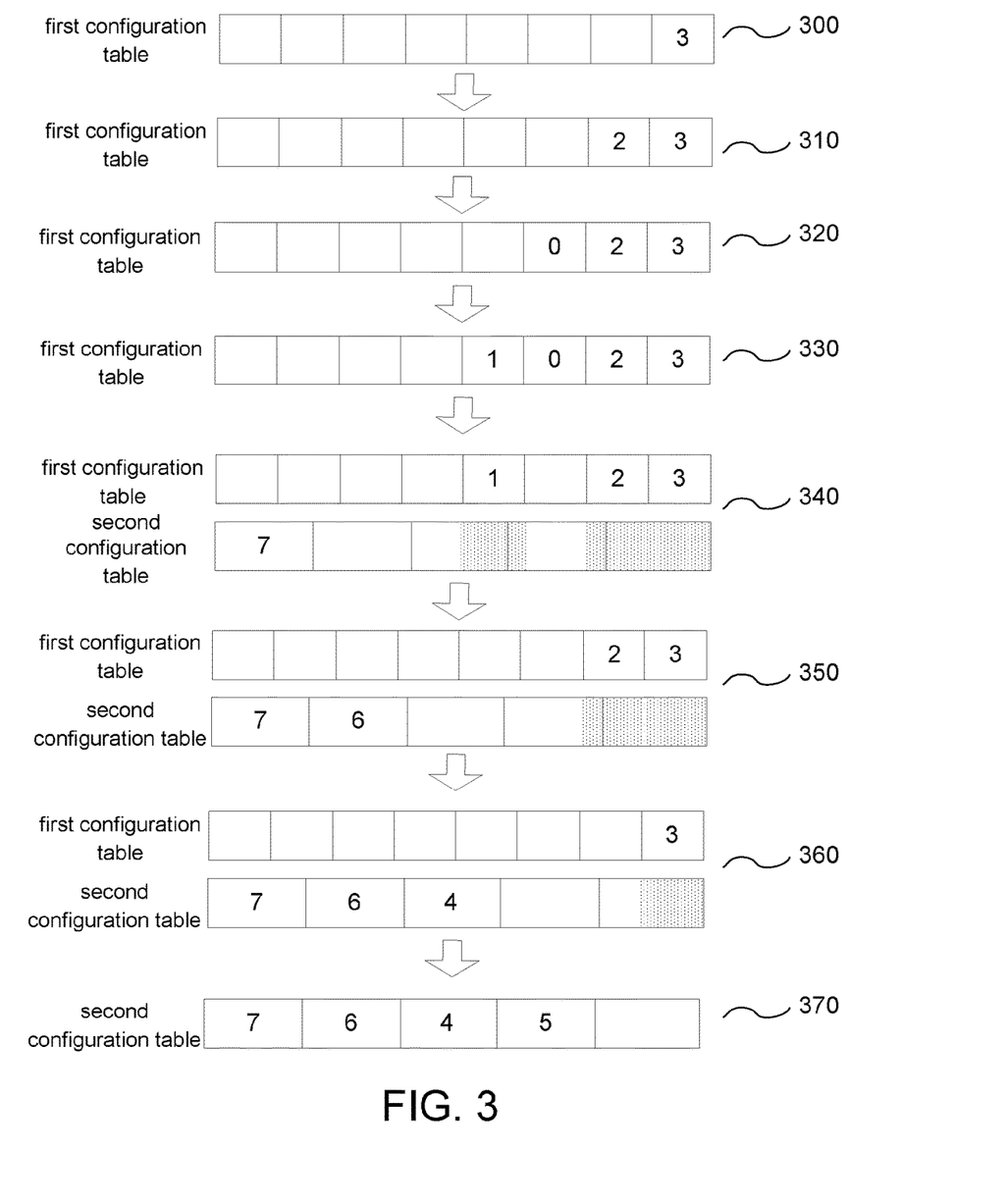
FIG. 3 is a schematic diagram of writing images into a memory according to an embodiment of the present invention.

FIG. 3 shows a schematic diagram of a method for writing images into a memory according to an embodiment of the present invention.

A video stream is an encoded file, and images in the video stream are not necessarily decoded according to a playback sequence. Taking the embodiment for example, a decoding sequence of the images is the $3^{rd}$ image, the $2^{nd}$ image, the $0^{th}$ image, the $1^{st}$ image, the $7^{th}$ image, the $6^{th}$ image, the $4^{th}$ image and the $5^{th}$ image. The images have respective time information, and are played in a sequence of the $0^{th}$ image, the $1^{st}$ image, . . . , the $6^{th}$ image and the $7^{th}$ image. The $3^{rd}$ image, the $2^{nd}$ image, the $0^{th}$ image and the $1^{st}$ image have the first resolution; the $7^{th}$ image, the $6^{th}$ image, the $4^{th}$ image and the $5^{th}$ image have the second resolution.

In a state 300, the memory is divided into eight first buffers by the first configuration table according to the first resolution, and the $3^{rd}$ image obtained from decoding is written into one of the first buffers. In states 310 to 330, the $2^{nd}$ image, $0^{th}$ image and $1^{st}$ image obtained from decoding are sequentially written into the first buffers according to the first configuration table. In a state 340, the $0^{th}$ image is accessed from the memory and played, and is thus marked as "accessed" (not shown in FIG. 3) in the first configuration table. The first buffer occupied by the $0^{th}$ image is then released for the use of other images. At this point, the resolution of the decoded $7^{th}$ image changes to the second resolution. Correspondingly, the memory is divided into five second buffers by a second configuration table according to the second resolution, and the decoded $7^{th}$ image is written into one of the second buffers.

It should be noted that, at this point, the first configuration table is not updated or deleted. Thus, when writing the $7^{th}$ image into the memory, it is still required to determine whether the first-resolution image having not yet been accessed (represented by a dotted area) is present at the position in the memory corresponding to the second buffer to which the $7^{th}$ image is to be written. If the first-resolution image having not yet been accessed is present, another second buffer is to be selected. In states 350 to 370, the $1^{st}$ image, the $2^{nd}$ mage and the $3^{rd}$ image are marked as "accessed" in the first configuration table after having been sequentially accessed, and the $6^{th}$ image, the $4^{th}$ image and the $5^{th}$ image are sequentially written into the second buffers of the memory according to the second configuration table. In a state 370, all of the images in the first configuration table have been accessed, and so the first configuration table is deleted.

In the foregoing embodiment, the first configuration table and the second configuration table are configured for the entire memory. For example, the first configuration table evenly divides the entire memory into a plurality of first buffers, each of which having a size sufficient for writing in one image having the first resolution. Similarly, the second configuration table evenly divides the entire memory into a plurality of second buffers, each of which having a size sufficient for writing in one image having the second resolution.

In another embodiment, the first configuration table configures a first part of the memory, and the second configuration table configures a second part of the memory. The first part and the second part are different parts of the memory, or may be partially overlapped. The first part is larger than the second part.

For example, when the first resolution is greater than a predetermined threshold, the first configuration table divides the entire memory space into a plurality of first buffers; when the resolution of a newly received image becomes the second resolution that is smaller than the first resolution and smaller than the predetermined threshold, only a part of the memory may be configured into a plurality of second buffers while reserving a part of the memory space. Thus, when the resolution of an image later received changes back to the first resolution or to a larger resolution, the newly received image may be written into the reserved memory space, so as to ensure that the memory has a sufficient continuous space for storing large-resolution images.

In a preferred embodiment, after receiving the image having the first resolution and establishing the corresponding first configuration table, the received images having the first resolution are sequentially written into the memory from one side of the memory along a first direction; after receiving the image having the second resolution and establishing the corresponding second configuration table, the received images having the second resolution are sequentially written into the memory from the other side of the memory along a second direction. As such, when the resolution of a newly received image changes, the above approach is capable of increasing the chance of having a sufficient continuous space in the memory for storing the newly received image.

Further, for the images having the same resolution, in the same configuration table, the configuration according to which the images are written into the memory is recorded, and the time information included in the images is also recorded. The time information may be in various forms such as presentation time stamps (PTS) or picture order counts (POC). When later accessing the images, the image to be accessed can be accordingly accessed from the correct position. It should be noted that, for the images having the same resolution, in addition to being recorded in the same configuration table as in the embodiment, the configuration according to which the images are written into the memory and the time information included in the images may also be recorded to the same location or different locations in other embodiments.

Figure 4:
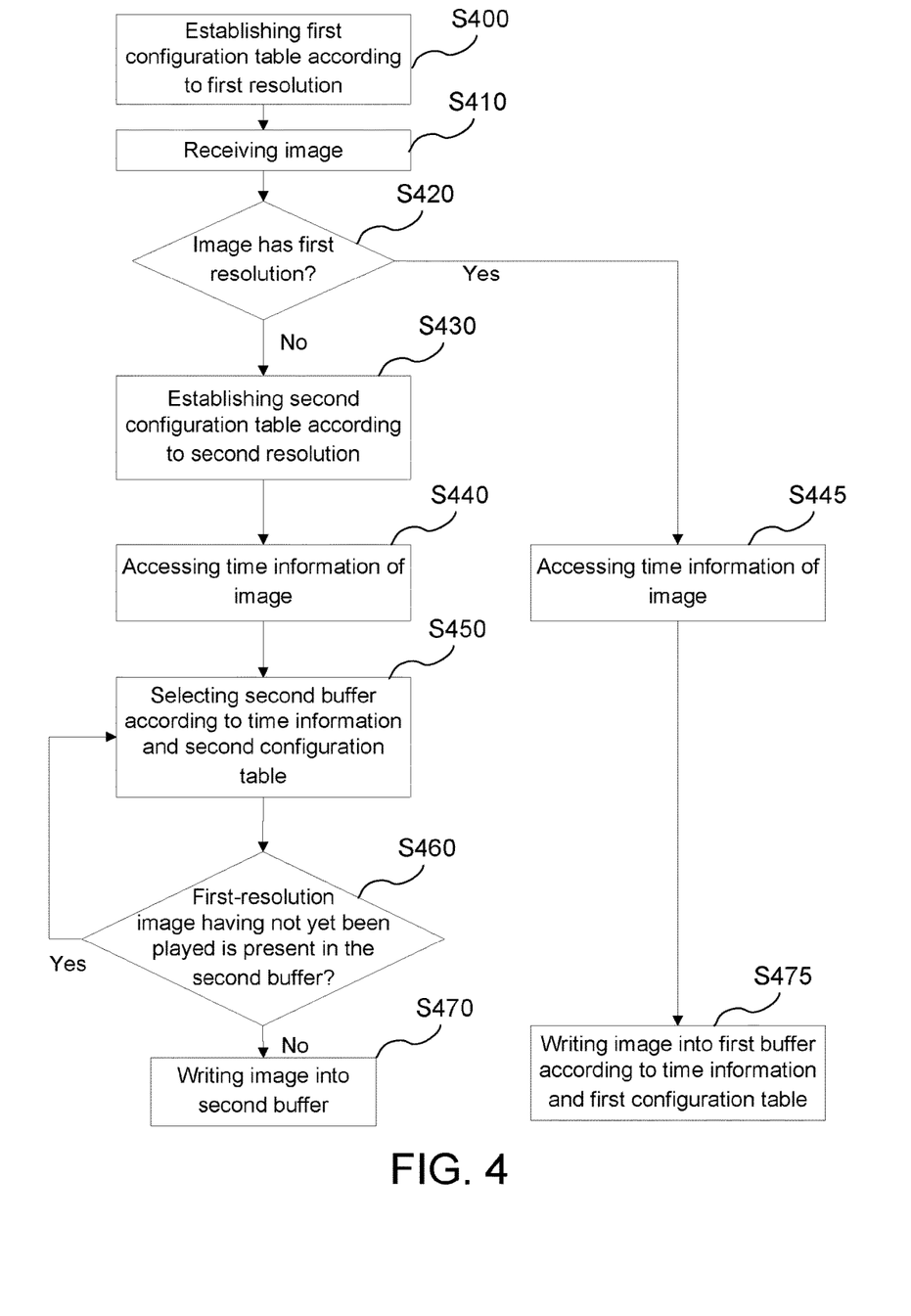
FIG. 4 is a flowchart of a method for writing images into a memory according to another embodiment of the present invention.

FIG. 4 shows a flowchart of a method for writing images into a memory according to another embodiment of the present invention.

After a receiving end receives a video stream and obtains image data from the video stream by demultiplexing, step S400 is performed to establish a first configuration table according to a first resolution of an image in the image data. The first configuration table is associated with a utilization configuration of a memory, configures the memory into a plurality of first buffers, and records whether the first buffers are written with images and whether the written images have been accessed. When later playing the images, the images in the memory are sequentially accessed and played according to the information recorded in the first configuration table.

In step S410, an image is received. The image may adopt a different resolution due to a change in the network bandwidth or wireless transmission speed. In step S420, it is determined whether the resolution of the received image is still the first resolution according to information in the video stream. Step S445 is performed when the resolution of the received image is still the first resolution, or else step S430 is performed when the resolution of the received image is a second resolution.

In step S445, the time information corresponding to the image is accessed. The time information is associated with a display time of the image. In step S475, the image is written into the first buffer of the memory according to the time information of the image and the first configuration table.

When a plurality of other first-resolution images having not yet been accessed are present in the memory, the time information of the other images is obtained from the first configuration table and compared to accordingly select one appropriate first buffer for writing the received image. A selection principle is storing images having similar time information to near or adjacent first buffers.

For example, one other image corresponding to the time information most similar to the corresponding time information of the received image is selected, and the received image is written into the first buffer adjacent to or near the first buffer in which this one other image is written. When the first buffer adjacent to or near the first buffer in which this one other image is written is occupied by an image that has not yet been accessed, one other image corresponding to the time information second most similar to the corresponding time information of the received image is selected, and the received image is written into the first buffer adjacent to or near the first buffer in which this one other image is written.

In step S430, a second configuration table is established according to the second resolution. The second configuration table is associated with the utilization configuration of the memory, configures the memory into a plurality of second buffers, and records whether the second buffers are written with images and whether the written images have been accessed. When later playing an image, the image is accessed and played according to the information recorded in the second configuration table. In step S440, the time information corresponding to the received image is accessed. The time information is associated with a display time of the received image.

In step S450, the second buffer is selected according to the time information of the received image and the second configuration table. When a plurality of other second-resolution images having not yet been accessed are present in the memory, the time information of the other images is obtained from the second configuration table and compared, one other image corresponding to the time information most similar to the corresponding time information of the received image is selected, and the received image is written into the second buffer adjacent to or near the second buffer of this one other image.

When the second buffer adjacent to or near the second buffer in which this one other image is written is occupied by an image that has yet not been accessed, one other image corresponding to the time information second most similar to the corresponding time information of the received image is selected, and the received image is written into the second buffer adjacent to or near the second buffer in which this one other image is written.

In step S460, according to the first configuration table, it is determined whether the first-resolution image having not yet been played is present at the position of the selected second buffer. When no first-resolution image having not yet been played is present, step S470 is performed to write the received image into the selected second buffer. When the first-resolution image having not yet been played is present, step S460 is iterated to select another second buffer according to the time information and the second configuration table.

According to the embodiment, the images having similar time information are written into close buffers. Thus, when playing the images, the images at these close buffers are successively accessed to more easily release a larger continuous available space. Further, when the resolution changes, more particularly changing to a larger resolution, an available space can be more easily found for writing the image.

Figure 5:
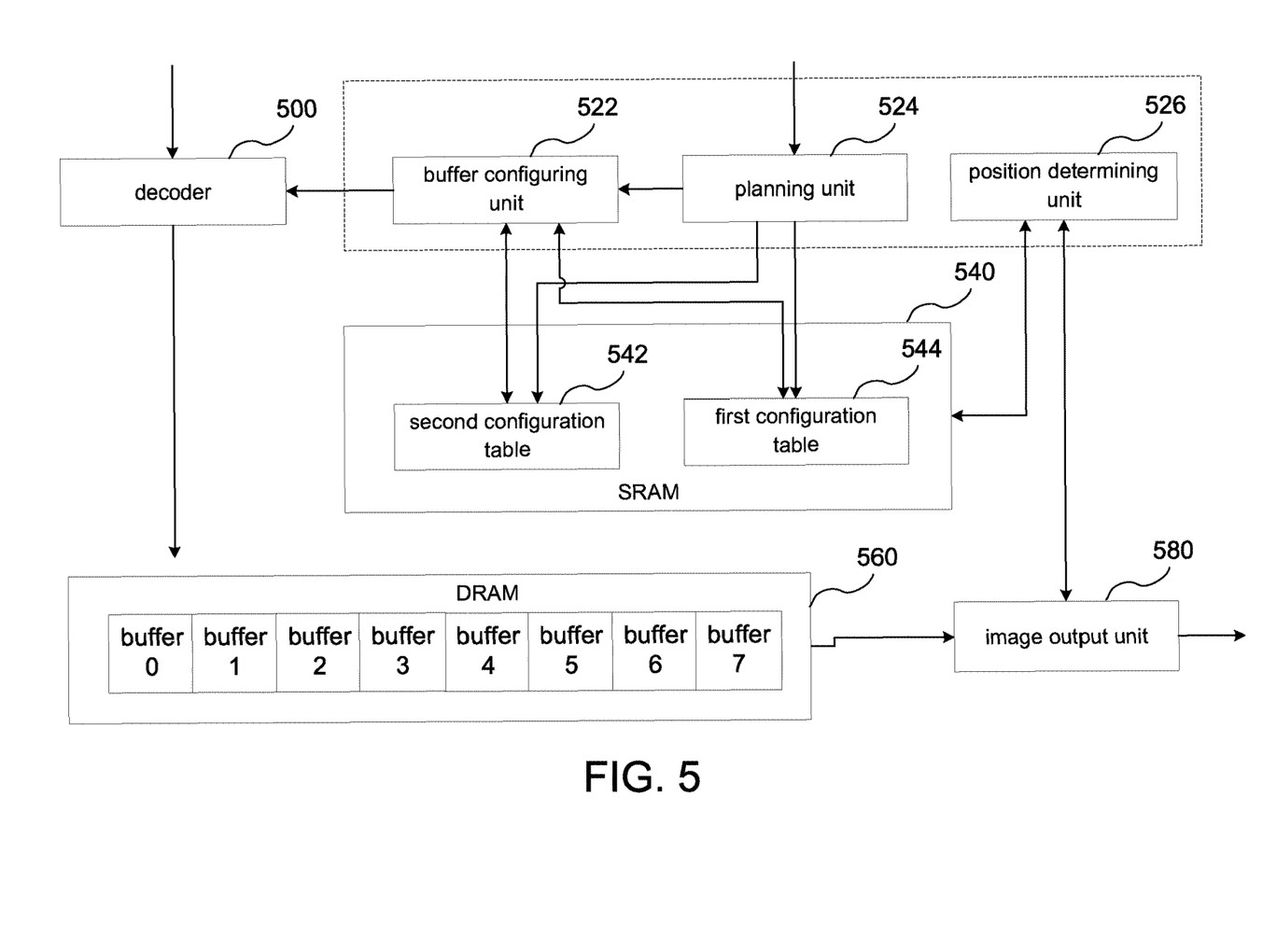
FIG. 5 is a block diagram of applying an apparatus for writing images into a memory to a playback apparatus according to an embodiment of the present invention.

FIG. 5 shows a block diagram of an apparatus for writing images into a memory applied to a playback device according to an embodiment of the present invention. The apparatus includes a planning unit 524 and a buffer configuring unit 522. The planning unit 524 performs step S400 to establish a first configuration table 544 according to a first resolution, and performs step S430 to establish a second configuration table 542 according to a second resolution.

The first configuration table 544 is associated with a utilization configuration of a memory 560, configures the memory 560 into a plurality of first buffers, and records whether the first buffers are written with images and whether the written images have been accessed.

The second configuration table 542 is associated with the utilization configuration of the memory 560, configures the memory 560 into a plurality of second buffers, and records whether the second buffers are written with images and whether the written images have been accessed.

The planning unit 524 further performs step S420 to determine whether the resolution of the newly added resolution still adopts the first resolution according to the information in the video stream, and performs step S440 and step S445 to access the time information included in the image. The time information is associated with a display time of the image.

The buffer configuring unit 522 receives an analysis result from the planning unit 524, determines to write the image into the first buffer of the memory 560 according to the time information of the image and the first configuration table 544, and sends a configuration result to a decoder 500.

According to the analysis result from the planning unit 524, the buffer configuring unit 522 further performs step S450 to determine the second buffer according to the time information of the image and the second configuration table 542. The buffer configuring unit 522 further performs step S460 to determine whether the first-resolution image having not yet been played is present in the second buffer according to the first configuration table 544, and to send a determination result to the decoder 500.

The decoder 500 performs step S410 to receive and decode the image, and performs step S470 and step S475 to write the image into the memory 560 according to a configuration result sent from the buffer configuring unit 522. Due to a change in the network bandwidth or wireless transmission speed, the image may adopt a different resolution.

An image output unit 580 transmits a request instruction to a position determining unit 526 when playing the images. After receiving the request instruction, the position determining unit 526 determines the images to be accessed from the memory 560 according to the time information of the images recorded in the first configuration table 544 and the second configuration table 542. The image output unit 580 accordingly accesses and outputs the images from the memory 560.

In an embodiment of the present invention, the first configuration table 544 and the second configuration table 542 are implemented by a static random access memory (SRAM) 540. In an embodiment of the present invention, the memory 560 is implemented by a dynamic random access memory (DRAM). In other embodiments, the DRAM 560 and the SRAM 540 may also be implemented by other forms of storage devices.

In an embodiment of the present invention, the buffer configuring unit 522, the planning unit 524 and the position determining unit 526 may be implemented by software programs executed by a central processor.

It is known from the above description that, when the present invention writes images into a memory, a first configuration table 544 is first established according to a first resolution, and then the planning unit 524 checks whether the resolution of a received image changes from the first resolution to a second resolution. When the resolution of the received image changes to the second resolution, a second configuration table 542 is established while the first configuration table 544 is reserved.

That is to say, data in the first configuration table 544 is not deleted. As such, when the buffer configuring unit 522 determines the positions for filling in the images, the first configuration table 544 and the second configuration table 542 can be simultaneously referred such that the first-resolution images having not been played are not be missed. Therefore, when adopting the present invention, an issue of replacing one or multiple images with a black image is not incurred, thereby achieving the object of seamless switching of images having different resolutions.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for writing images into a single memory space, comprising:
    at a first time point, establishing a first configuration table according to a first resolution of a first image of a video stream, wherein the first configuration table is associated with a utilization configuration of the single memory space and configures the single memory space into a plurality of first buffers;
    determining one of the first buffers to which the first image is to be written into the single memory space according to the first configuration table, and writing the first image into a resulting determined first buffer;
    at a second time point, establishing a second configuration table according to a second resolution of a second image of the video stream, wherein the second configuration table is associated with the utilization configuration of the single memory space and configures the single memory space into a plurality of second buffers, and the second resolution is different from the first resolution; and
    determining one of the second buffers to which the second image is to be written into the single memory space according to the first configuration table and the second configuration table, and writing the second image into a resulting determined second buffer,
    wherein a size of each of the first buffers is associated with the first resolution, and a size of each of the second buffers is associated with the second resolution,
    wherein the first image is played, rather than a black image, when a resolution of the video stream changes from the first resolution to the second resolution, and
    wherein the first configuration table and the second configuration table are simultaneously referred to such that first resolution images having not been played are not missed, and both the first image and the second image are played.

2. The method according to claim 1, wherein the first configuration table records whether the first buffers are written with images and whether the images have been accessed.

3. The method according to claim 2, wherein the step of determining the one of the first buffers and the second buffers to which the second image is to be written into the single memory space according to the first configuration table and the second configuration table comprises:
    selecting one second buffer from the single memory space according to the second configuration table;
    determining whether an image having not been accessed is present in the selected second buffer according to the first configuration table, and writing the second image into the selected second buffer when no image having not been accessed is present in the selected second buffer; and
    selecting one other second buffer from the single memory space according to the second configuration table when the image having not been accessed is present in the selected second buffer.

4. The method according to claim 1, wherein the first configuration table configures a first part of the single memory space according to the first resolution, the second configuration table configures a second part of the memory according to the second resolution, and the first part is larger than the second part.

5. The method according to claim 1, wherein the one of the first buffers and the second buffers to which the first image is to be written into the single memory space is determined according to the first configuration table and time information corresponding to the first image.

6. The method according to claim 5, wherein when other images are present in the single memory space, the step of determining the one of the first buffers and the second buffers to which the first image is to be written into the single memory space according to the first configuration table and time information corresponding to the first image comprises:
    determining the one of the first buffers and the second buffers to which the first image is to be written into the single memory space according to a relationship between the time information corresponding to the first image and time information corresponding to the other images.

7. The method according to claim 1, wherein the one of the first buffers and the second buffers to which the second image is to be written into the single memory space is determined according to the first configuration table, the second configuration table and time information corresponding to the second image.

8. An apparatus for writing images into a single memory space, the apparatus comprising: a processor,
    the processor configured to execute a planning unit, configured to establish a first configuration table according to a first resolution of a first image of a video stream and to establish a second configuration table according to a second resolution of a second image of the video stream, wherein the first configuration table is associated with a utilization configuration of the single memory space and configures the single memory space into a plurality of first buffers, the second configuration table is associated with the utilization configuration of the single memory space and configures the single memory space into a plurality of second buffers, and the second resolution is different from the first resolution; and
    the processor further configured to execute a buffer configuring unit, configured to:
    determining one of the first buffers to which the first image is to be written into the single memory space according to the first configuration table, and writing the first image into a resulting determined first buffer;
    determine one of the second buffers to which the second image is to be written into the single memory space according to the first configuration table and the second configuration table, and write the second image into a resulting determined second buffer,
    wherein a size of each of the first buffers is associated with the first resolution, and a size of each of the second buffers is associated with the second resolution,
    wherein the first image is played, rather than a black image, when a resolution of the video stream changes from the first resolution to the second resolution, and
    wherein the first configuration table and the second configuration table are simultaneously referred to such that first resolution images having not been played are not missed, and both the first image and the second image are played.

9. The apparatus according to claim 8, wherein the first configuration table records whether the first buffers are written with images and whether the images have been accessed.

10. The apparatus according to claim 9, wherein the buffer configuring unit selects one second buffer from the single memory space according to the second configuration table, determines whether an image having not been accessed is present in the selected second buffer according to the first configuration table, writes the second image into the selected second buffer when no image having not been accessed is present in the selected second buffer, and selects one other second buffer from the single memory space according to the second configuration table when the image having not been accessed is present in the selected second buffer.

11. The apparatus according to claim 8, wherein the first configuration table configures a first part of the single memory space according to the first resolution, the second configuration table configures a second part of the single memory space according to the second resolution, and the first part is larger than the second part.

12. The apparatus according to claim 8, wherein the buffer configuring unit determines the one of the first buffers and the second buffers to which the first image is to be written into the single memory space according to the first configuration table and time information corresponding to the first image.

13. The apparatus according to claim 12, wherein when other images are present in the single memory space, the buffer configuring unit determines the one of the first buffers and the second buffers to which the first image is to be written into the single memory space according to a relationship between the time information corresponding to the first image and time information corresponding to the other images.

14. The apparatus according to claim 8, wherein the buffer configuring unit determines the one of the first buffers and the second buffers to which the second image is to be written into the single memory space according to the first configuration table, the second configuration table and time information corresponding to the second image.

15. The apparatus according to claim 8, wherein the planning unit and the buffer configuring unit are implemented by software executed by the processor.

* * * * *